(12) United States Patent
Suciu et al.

(10) Patent No.: US 9,932,905 B2
(45) Date of Patent: Apr. 3, 2018

(54) BYPASS DUCT HEAT EXCHANGER WITH CONTROLLED FAN

(71) Applicant: United Technologies Corporation, Hartford, CT (US)

(72) Inventors: Gabriel L. Suciu, Glastonbury, CT (US); Wesley K. Lord, South Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 227 days.

(21) Appl. No.: 14/745,606

(22) Filed: Jun. 22, 2015

(65) Prior Publication Data

US 2016/0369706 A1    Dec. 22, 2016

(51) Int. Cl.

| F02C 9/00 | (2006.01) |
| F02C 9/18 | (2006.01) |
| F02K 3/115 | (2006.01) |
| F02C 6/08 | (2006.01) |
| F02C 7/14 | (2006.01) |
| F02C 7/06 | (2006.01) |

(52) U.S. Cl.
CPC ............ *F02C 9/18* (2013.01); *F02C 6/08* (2013.01); *F02C 7/14* (2013.01); *F02K 3/115* (2013.01); *F02C 7/06* (2013.01); *F05D 2230/31* (2013.01); *F05D 2260/213* (2013.01); *Y02T 50/675* (2013.01)

(58) Field of Classification Search
CPC .... F02C 7/14; F02C 7/06; F02K 3/115; F05D 2260/213
See application file for complete search history.

(56) References Cited

U.S. PATENT DOCUMENTS

| 5,269,135 A | 12/1993 | Vermejan et al. |
| 5,724,828 A | 3/1998 | Koenic |
| 5,987,877 A | 11/1999 | Steiner |
| 6,695,038 B2 | 2/2004 | Lopatinsky et al. |
| 6,786,036 B2 | 9/2004 | Kight |
| 8,266,889 B2 | 9/2012 | Coffinberry |

(Continued)

FOREIGN PATENT DOCUMENTS

| EP | 1669551 A2 | 6/2006 |
| EP | 2636982 A2 | 9/2013 |

(Continued)

OTHER PUBLICATIONS

European Search Report for European Application No. 16175506.1 dated Nov. 23, 2016.

*Primary Examiner* — Pascal M Bui Pho
*Assistant Examiner* — Katheryn Malatek
(74) *Attorney, Agent, or Firm* — Carlson, Gaskey & Olds P.C.

(57) ABSTRACT

A gas turbine engine comprises a main fan that delivers air into a bypass duct and into a core engine. A heat exchanger is positioned within the bypass duct and receives a fluid to be cooled from a component associated with the gas turbine engine. A heat exchanger fan is positioned to draw air across the heat exchanger and a control for the heat exchanger fan. The control is programmed to stop operation of the fan during certain conditions, and to drive the heat exchanger fan under other conditions. A method of forming a heat exchanger is also disclosed.

12 Claims, 2 Drawing Sheets

(56) References Cited

U.S. PATENT DOCUMENTS

2004/0020213 A1\* 2/2004 Jones .................. F28D 15/02
  60/772
2013/0236299 A1\* 9/2013 Kington ................ F02C 7/10
  415/177

FOREIGN PATENT DOCUMENTS

WO  2014051678 A1  4/2014
WO  WO 2014051678 A1 \* 4/2014  .............. F02K 3/115

\* cited by examiner

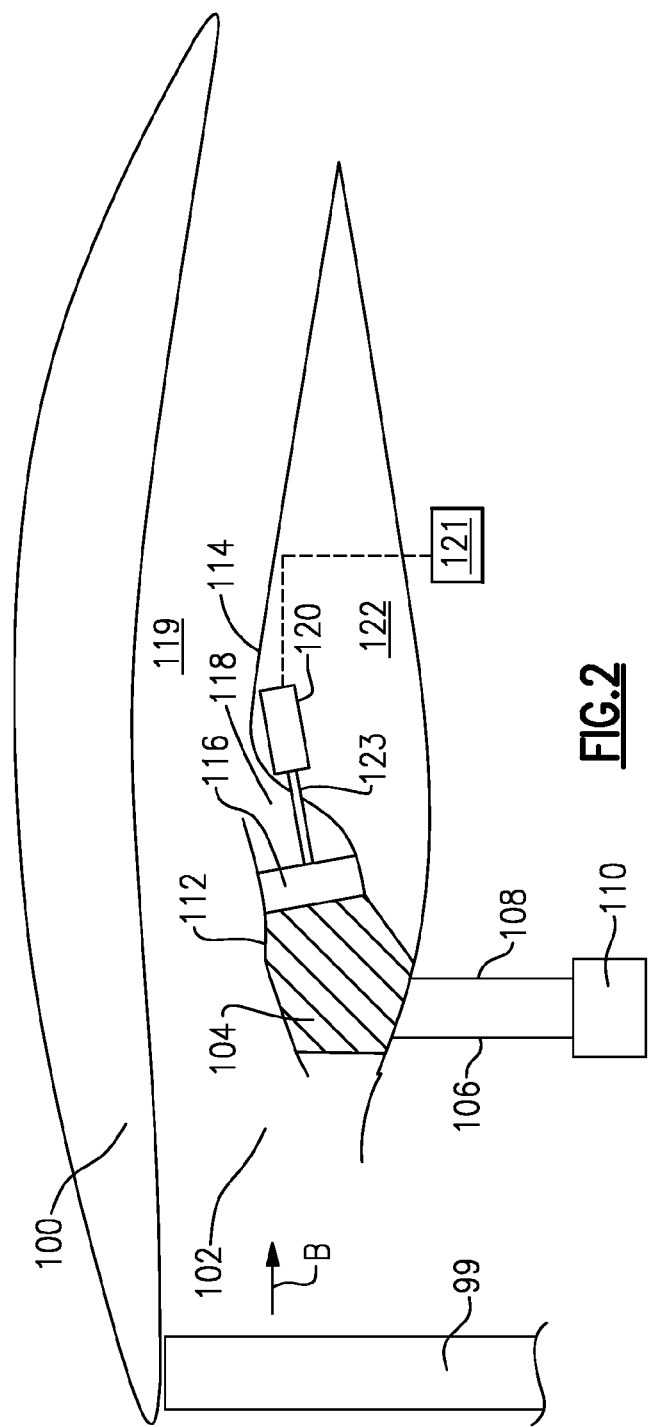
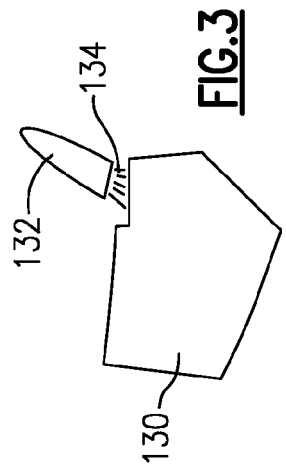

BYPASS DUCT HEAT EXCHANGER WITH CONTROLLED FAN

BACKGROUND OF THE INVENTION

This application relates to the placement of a heat exchanger in a gas turbine engine bypass duct where a fan is controlled to selectively draw air across the heat exchanger.

Gas turbine engines are known and typically include a fan delivering air into a bypass duct as propulsion air and into a compressor as core airflow. The air is compressed in the compressor and delivered into a combustion section where it is mixed with fuel and ignited. Products of this combustion pass downstream over turbine rotors, driving them to rotate.

As known, there are a number of accessories associated with a gas turbine engine. Various fluids associated with the accessories require cooling. Thus, it is known to place heat exchangers into various locations in a gas turbine engine.

One such location is in the bypass duct, such that a fluid within the heat exchanger is cooled by the bypass air. However, the pressure ratio delivered by the fan is becoming lower with the recent advent of a gear reduction driving the fan rotor at slower speeds. In addition, during the course of operation of a gas turbine engine associated with an aircraft, the amount of air driven through the bypass duct will vary. Further, the cooling challenges on the heat exchanger will vary. As an example, at takeoff conditions, the cooling load will tend to be greater than it will be at cruise conditions.

Known gas turbine engines have heat exchanger which are sized for the highest heat load challenge.

SUMMARY OF THE INVENTION

In a featured embodiment, a gas turbine engine comprises a main fan that delivers air into a bypass duct and into a core engine. A heat exchanger is positioned within the bypass duct and receives a fluid to be cooled from a component associated with the gas turbine engine. A heat exchanger fan is positioned to draw air across the heat exchanger and a control for the heat exchanger fan. The control is programmed to stop operation of the fan during certain conditions, and to drive the heat exchanger fan under other conditions.

In another embodiment according to the previous embodiment, the control commands a motor to drive the heat exchanger fan under high heat load conditions.

In another embodiment according to any of the previous embodiments, the high heat load conditions at least include takeoff of an associated aircraft.

In another embodiment according to any of the previous embodiments, the control commands the motor to turn off the heat exchanger fan under low heat load conditions.

In another embodiment according to any of the previous embodiments, the low heat load conditions include a cruise condition of an associated aircraft.

In another embodiment according to any of the previous embodiments, the motor is positioned within a space of a fairing such that it is out of a path of air downstream of the heat exchanger fan.

In another embodiment according to any of the previous embodiments, the heat exchanger is formed through an additive manufacturing process.

In another embodiment according to any of the previous embodiments, air downstream of the heat exchanger fan is delivered to mix back into a bypass airflow path.

In another embodiment according to any of the previous embodiments, a shaft connects a rotor of the heat exchanger fan to the motor.

In another embodiment according to any of the previous embodiments, the control commands the motor to turn off the heat exchanger fan under low heat load conditions.

In another embodiment according to any of the previous embodiments, the low heat load conditions include a cruise condition of an associated aircraft.

In another embodiment according to any of the previous embodiments, the motor is positioned within a space of a fairing such that it is out of a path of air downstream of the heat exchanger fan.

In another embodiment according to any of the previous embodiments, a shaft connects a rotor of the heat exchanger fan to the motor.

In another embodiment according to any of the previous embodiments, the heat exchanger is formed through an additive manufacturing process.

In another embodiment according to any of the previous embodiments, air downstream of the heat exchanger fan is delivered to mix back into a bypass airflow path.

In another embodiment according to any of the previous embodiments, the motor is positioned within a space of a fairing such that it is out of a path of air downstream of the heat exchanger fan.

In another embodiment according to any of the previous embodiments, a shaft connects a rotor of the heat exchanger fan to the motor.

In another embodiment according to any of the previous embodiments, the heat exchanger is formed through an additive manufacturing process.

In another embodiment according to any of the previous embodiments, air downstream of the heat exchanger fan is delivered to mix back into a bypass airflow path.

In another featured embodiment, a method of forming a heat exchanger comprises the steps of determining an available space within a gas turbine engine for the heat exchanger, and forming the heat exchanger to conform to the available space utilizing an additive manufacturing process.

These and other features may be best understood from the following drawings and specification.

BRIEF DESCRIPTION OF THE DRAWINGS

FIG. 2 shows a portion of the FIG. 1 gas turbine engine.
FIG. 3 shows a manufacturing technique for a heat exchanger.

DETAILED DESCRIPTION

Figure 1:
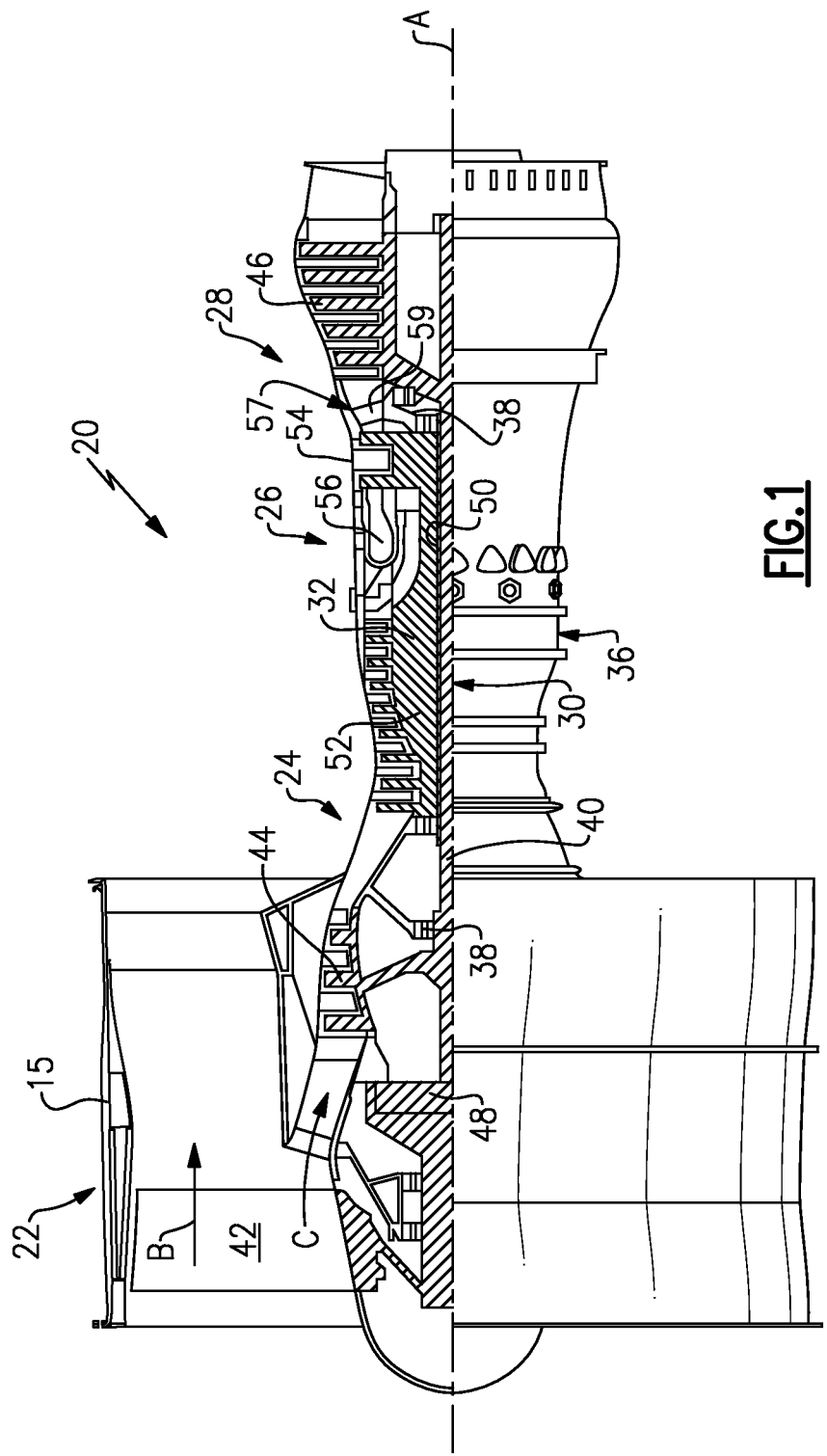
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second (350.5 meters/second).

A fan rotor 99 is shown schematically in FIG. 2 delivering air within a nacelle 100 and into a bypass duct 102. A heat exchanger 104 is positioned within the path of air in the bypass duct 102. A first fluid line 106 and a second fluid line 108 connect an accessory 110 of the gas turbine engine to flow a fluid through the heat exchanger 104. As an example, lines 106 and 108 may move oil from an accessory 110 (which may be a bearing, a generator, etc.) through the heat exchanger 104. At any rate, some operational fluid is cooled within the heat exchanger 104 by having air from the bypass duct 102 pass over it.

A housing 112 is positioned outwardly of the heat exchanger 104. As can be appreciated, there is a unique space radially inwardly of the housing 112 which receives the heat exchanger 104. A fairing 114 is also positioned within the bypass duct 102 and together with the housing 112 forms the space for receiving the heat exchanger 104. A heat exchanger fan rotor 116 selectively draws air across the heat exchanger 104. Air downstream of the heat exchanger 104 leaves through an exit 118 to mix with a normal downstream bypass path 119. A motor 120 for the fan rotor 116 sits within an internal space 122 of the fairing 114. A control 121 controls the speed of the motor 120.

During takeoff, when the heat load on the heat exchanger 104 will be high, the control 121 commands the motor 120 to drive the fan rotor 116. However, during lower heat load conditions, such as cruise, the control 121 commands the motor 120 to turn the fan rotor 116 off. During intermediate operational points, the fan rotor 116 may be rotated at slower speeds as appropriate.

A shaft 123 connects the fan rotor 116 to the motor 120 such that the motor 120 can be positioned in the space 122, where it will not be exposed to heat in the air in the downstream portion 118.

The size of the heat exchanger 104 may be reduced relative to the prior art, as the air flow across heat exchanger 104 will be optimized due to the fan 116.

FIG. 3 shows another feature. An intermediate heat exchanger 130 is being formed by an additive manufacturing tool 132. As known, additive manufacturing includes a number of distinct steps which essentially lay down material 134 in layers to form a final component, such as the heat exchanger 104. With additive manufacturing, it is relatively easy to form a heat exchanger 104 of any unique shape such that the space available in a particular engine is utilized.

The FIG. 3 method of forming a heat exchanger comprises the steps of determining an available space within a gas turbine engine for the heat exchanger, and forming a heat exchanger 130 to conform to the available space utilizing an additive manufacturing process 132/134.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a main fan delivering air into a bypass duct and into a core engine;
a heat exchanger positioned within said bypass duct, said heat exchanger receiving a fluid to be cooled from a component associated with the gas turbine engine;
a heat exchanger fan positioned to draw the air across said heat exchanger and a control for said heat exchanger fan, said control being programmed to stop operation of the heat exchanger fan during certain conditions, and to drive the heat exchanger fan under other conditions; and
said control is programmed to command a motor to drive the heat exchanger fan during takeoff of an associated aircraft.

2. The gas turbine engine as set forth in claim 1, wherein said control is programmed to command said motor to turn off said heat exchanger fan during a cruise condition of the associated aircraft.

3. The gas turbine engine as set forth in claim 2, wherein said motor is positioned within a space of a fairing such that said motor is out of a path of the air downstream of said heat exchanger fan.

4. The gas turbine engine as set forth in claim 3, wherein said heat exchanger is formed through an additive manufacturing process.

5. The gas turbine engine as set forth in claim 3, wherein the air downstream of said heat exchanger fan is delivered to mix back into a bypass airflow path.

6. The gas turbine engine as set forth in claim 3, wherein a shaft connects a rotor of said heat exchanger fan to said motor.

7. The gas turbine engine as set forth in claim 2, wherein said heat exchanger is formed through an additive manufacturing process.

8. The gas turbine engine as set forth in claim 2, wherein air downstream of said heat exchanger fan is delivered to mix back into a bypass airflow path.

9. The gas turbine engine as set forth in claim 1, wherein said motor is positioned within a space of a fairing such that said motor is out of a path of air downstream of said heat exchanger fan.

10. The gas turbine engine as set forth in claim 9, wherein a shaft connects a rotor of said heat exchanger fan to said motor.

11. The gas turbine engine as set forth in claim 1, wherein said heat exchanger is formed through an additive manufacturing process.

12. The gas turbine engine as set forth in claim 1, wherein the air downstream of said heat exchanger fan is delivered to mix back into a bypass airflow path.

* * * * *